United States Patent [19]

Deetz, III

[11] Patent Number: 4,937,077
[45] Date of Patent: Jun. 26, 1990

[54] METHOD FOR IMPROVING FEED CONVERSION OF MEAT-PRODUCING ANIMALS BY ORAL ADMINISTRATION OF 2-DEOXY-D-HEXOSE

[75] Inventor: Lawrence E. Deetz, III, Kingsport, Tenn.

[73] Assignee: Eastman Kodak Company, Rochester, N.Y.

[21] Appl. No.: 99,028

[22] Filed: Sep. 21, 1987

[51] Int. Cl.$^5$ .................. A23K 1/16; A61K 31/70
[52] U.S. Cl. .................. 424/442; 514/23; 426/2; 426/658; 426/807
[58] Field of Search ........... 514/23; 424/442; 426/2, 426/658, 807

[56] References Cited

U.S. PATENT DOCUMENTS

| | | | |
|---|---|---|---|
| 3,215,597 | 11/1965 | Stevenson | 426/2 |
| 3,310,469 | 3/1967 | Paulshock et al. | 514/23 |
| 4,070,487 | 1/1978 | Trout et al. | 426/2 |
| 4,315,001 | 2/1982 | Blough | 514/23 |
| 4,368,190 | 1/1983 | Shen et al. | 424/88 |
| 4,678,779 | 7/1987 | Meyers et al. | 514/176 |
| 4,696,919 | 9/1987 | Hinohara et al. | 514/62 |
| 4,701,441 | 10/1987 | Kalra | 424/110 |

FOREIGN PATENT DOCUMENTS

| | | |
|---|---|---|
| 0221217 | 2/1958 | Australia . |
| 0262975 | 4/1964 | Australia . |
| 0562589 | 9/1958 | Canada . |
| 0619923 | 5/1961 | Canada . |
| 0649341 | 9/1962 | Canada . |
| 45-6856 | 3/1970 | Japan . |
| 58-60956 | 4/1983 | Japan . |
| 58-69816 | 4/1983 | Japan . |
| 0821269 | 10/1959 | United Kingdom . |

OTHER PUBLICATIONS

Smith et al.; Chemical Abstracts 71:110686b (1969).
Balagura et al.; Chemical Abstracts 83:157829p (1975).
Stricker et al.; Chemical Abstracts 88:146779z (1978).
Thompson et al.; Chemical Abstracts 101:184694n (1984).
Friedman et al.; Chemical Abstracts 106:47746v (1987).
Rowland; Physiol. Behav. 26:901-903 (1981).
Kanarek et al.; Pharmacology Biochemistry & Behavior, vol. 8, pp. 615-617 (1978).
Coimbra et al.; American Journal of Physiology 236:E317-E322 (1979).
Thompson et al.; American Journal of Physiology 247 (3, pt. 2): R560-R566 (1984).
Katafuchi et al.; Brain Research 359:1-9 (1985).
M. Rezek and E. A. Kroeger, *J. Nutr.*, 106, pp. 143-157 (1976).
T. R. Houpt, *Am. J. Physiol.*, 227, pp. 161-167 (1974).
G. P. Smith and A. W. Root, *Endocrinology*, 85, pp. 963-968 (1969).
E. Ipp et al., *63rd Annual Meeting of the Endocrine Society*, p. 104 (1981).

C. C. Coimbra et al., *Am. J. Physiol*, 236, pp. 317-327 (1979) (Abstract).
G. M. Grodsky, "The Chemistry and Functions of Hormones", in: *Review of Physiological Chemistry*, Lange Medical Publications, Los Altos, Cal., p. 493 (1975).
J. G. Spivak et al., *Virology*, 123, pp. 123-138 (1982) (Abstract).
S. Kagawa et al., *Indian J. Biochem. Biophys.* 23, pp. 127-132 (1986).
H. I. Nakada and A. N. Wick, *J. Biol. Chem.*, 222, pp. 671-676 (1956).
A. N. Wick et al., *J. Biol. Chem.*, 224, pp. 963-969 (1957).
A. N. Wick et al., *Proc. Soc. Exper. Biol. & Med.*, 89, pp. 579-582 (1955).
J. Brown and H. L. Bachrach, *Proc. Soc. Exper. Biol. & Med.*, 100, pp. 641-643 (1959).
B. R. Landau and H. A. Lubs, *Proc. Soc. Exper. Biol. & Med.*, 99, pp. 124-127 (1958).
B. Hokfelt and G. Hultquist, *Proc. Soc. Exper. Biol. & Med.*, 107, pp. 66-68 (1961).
J. Laszlo et al., *J. of the National Cancer Institute*, 24(2), pp. 267-279 (1960).
J. Laszlo et al., *J. of the National Cancer Institute*, 21(3), pp. 475-483 (1958).
B. R. Landau et al., *J. of the National Cancer Institute*, 21(3), pp. 485-494 (1958).
E. D. Kilbourne, *Nature*, 183, pp. 271-272 (1959).
J. Brown, *Metabolism*, 11(10) pp. 1098-1112 (1962).
N. Friedmann and H. E. Wertheimer, *Metabolism*, 15(3) pp. 222-235 (1966).
S. Balagura and M. Kanner, *Physiology and Behavior*, 7, pp. 251-255 (1971).
G. Kaluza et al., J. Gen. Virol, 14, pp. 251-259 (1972).
R. J. Courtney et al., *Virology*, 52, pp. 447-455 (1973).
M. R. Steiner et al., *Biochem. Biophys. Res. Comm.*, 61(2), pp. 795-801 (1974).
M. Rezek et al., *Physiology & Behavior*, 18, pp. 679-683 (1976).
K. Yoshida et al., *Horm. Metabol. Res.*, 16, pp. 120-124 (1984).
H. Hauner et al., *Horm. Metabol. Res.*, 17, pp. 620-621 (1985).
H. Witmanowski et al., *Acta Physiol. Pol.*, 36(4), pp. 270-275 (1985).

(List continued on next page.)

*Primary Examiner*—Ronald W. Griffin
*Assistant Examiner*—Nancy S. Carson
*Attorney, Agent, or Firm*—Thomas R. Savitsky; William P. Heath, Jr.

[57] ABSTRACT

Disclosed is a method for improving the feed conversion efficiency of meat-producing animals by oral administration of an effective amount of 2-deoxy-D-hexose such as 2-deoxy-D-glucose. Also disclosed are animal feed compositions comprising standard animal feed in admixture with 2-deoxy-D-hexose.

25 Claims, No Drawings

OTHER PUBLICATIONS

H. Fukumoto et al., *Biochem. Biophys. Res. Comm.*, 141(3), pp. 1201–1206 (1986).

J.-C. Painson and G. S. Tannenbaum, *Endocrinology*, 117(3), pp. 1132–1138 (1985).

S. Harvey, et al., *J. Endocr.*, 111, pp. 91–97 (1986).

A. B. Jenkins et al., *Int. J. Biochem.*, 18(4), pp. 311–318 (1986).

T. Katafuchi et al., *Brain Res.*, 359, pp. 1–9 (Abstract).

S. Wakabayashi et al., *Hyogo–Ika Daigaku Igakkai Zasshi*, 10(1), pp. 31–44 (1985) (Abstract).

M. M. Mareel et al., *Clin. Exp. Metastasis*, 3(3), pp. 197–207 (1985) (Abstract).

K. Nakamura et al., *Virology*, 84(2), pp. 303–319 (1978) (Abstract).

P. Yarowsky et al., *J. Neurosci* 6(3):859–866 (1986).

Sokoloff, B., Eddy, W. H., Saelhof, C. C., and Beach, J.: Glucose Antagonists in Experimental Cancer, *A.M.A. Arch. Path.* 59:729, 1955.

Ball, H. A., Wick, A. N., and Sanders, C.: Influence of Glucose Antimetabolites on the Walker Tumor, *Cancer Res.* 17:235, 1957.

Sokoloff, B., Saelhof, C. C., McConnell, B., and Simpson, M.: Additive Effect of Ascorbic Acid and Glucose Analogues on Experimental Cancer and Nucleic Acids in Tumor Tissue, *Growth* 22:51, 1958.

Burke, W. H., *Poultry Science*, 66:147–153 (1986) J.: Glucose.

Buonomo, F. C., et al., *Domestic Animal Endocrinology*, vol. 3(4):269–276 (1986).

N. Rowland, *Physiology & Behavior*, 26(5), pp. 901–903 (1981), "Glucoregulatory Feeding in Cats" (Abstract).

R. B. Kanarek et al., *Pharmacol. Biochem. Behav.*, 8(5), pp. 615–617 (1978), "The 2-Deoxy-D-Glucose Induced Feeding: Relation to Diet Palatability" (Abstract).

METHOD FOR IMPROVING FEED CONVERSION OF MEAT-PRODUCING ANIMALS BY ORAL ADMINISTRATION OF 2-DEOXY-D-HEXOSE

BACKGROUND OF THE INVENTION

As is well known, there is a need to develop methods that increase or optimize the productivity of meat-producing animals, including nonruminant and ruminant animals, to enhance food production. Known methods typically employ the use of growth permittants, that is the use of compounds such as antibiotics that help keep the animals free of disease to allow or permit the treated animals to grow at an enhanced level as compared to untreated animals. However, there is increased interest in metabolic modifiers that may or may not function as growth permittants, but still improve the feed conversion of animals through a different mechanism.

2-Deoxy-D-hexose derivatives are compounds that heretofore have not been known to improve the feed conversion of animals.

2-Deoxy-D-glucose is the most well known of the 2-deoxy-D-hexoses. 2-Deoxy-D-glucose is a structural analog of glucose that is known to act as a competitive inhibitor of the phosphohexoisomerase step of glycolysis causing a depression in intracellular glucose utilization [see: M. Rezek and E. A. Kroeger, "Glucose Antimetabolites and Hungar", J. Nutr., 106, p. 143 (1976)]. The metabolic changes initiated by intravenous administration of 2-deoxy-D-glucose alter the intracellular energy balance and therefore constitute a stimulus for the release of epinephrine from the adrenal medulla [see: G. P. Smith and A. W. Root, "Effect of Feeding on Hormonal Responses to 2-Deoxy-D-Glucose in Conscious Monkeys", *Endocrinology*, 85, pp. 963–968 (1969)]. The result of such an effect is an increase in circulating glucose (hyperglycemia) and the mobilization of free fatty acids. The hyperglycemia following intravenous administration of 2-deoxy-D-glucose is further potentiated by a reduction in cellular intake of glucose; however, the accumulated glucose is eventually cleared from the circulation and deposited in the liver as glycogen.

Intracerebroventricular administration of 2-deoxy-D-glucose has been shown in the prior art to increase circulating plasma somatostatin, glucose, and glucagon concentrations [see: E. Ipp, V. Piran, H. Richter, C. Garberoglio, A. Moossa and A. H. Rubenstein, "Central Nervous System Control Peripheral Circulating Somatostatin in Dogs: Effect of 2-Deoxyglucose", 63rd Annual Meeting of the Endocrine Society, p. 104 (1981)] and to increase the concentration of free fatty acids without affecting plasma insulin levels [see: C. C. Coimbra, J L. Gross, and R. H. Migliorini, "Intraventricular 2-Deoxyglucose, Glucose, Insulin and Free Fatty Acid Mobilization", *Am. J. Physiol.*, 236, pp. 317–327 (1979)]. Intravenous administration of 2-deoxy-D-glucose has been shown to slightly lower plasma somatostatin concentrations. 2-Deoxy-D-glucose also has been shown in the prior art to cause a prompt release of growth hormone [see: G. M. Grodsky, "The Chemistry and Functions of Hormones", In: *Review of Physiological Chemistry*, Lange Medical Publications, Los Altos, Calif., p. 493 (1975)], and to have antiviral activity [see: J. G. Spivack, W. H. Prusoff and T. R. Thomas, "A Study of the Viral Mechanism of Action of 2-Deoxy-D-Glucose," *Virology*, 123, pp. 123–138 (1982)]. In addition, 2-deoxy-D-glucose may stimulate the functional maturation of pancreatic B cells, insulin biosynthesis and proinsulin mRNA activity [see: S. Kagawa, K. Murakoso, K. Nakao, K-Mimura, and A. Matsuoka, "Maintenance of Pancreatic Endocrine Cells of the Neonatal Rat: Part VIII. Effect of 2-Deoxyglucose on Insulin Biosynthesis and Proinsulin mRNA Activity", *Indian J. Biochem. Biophys.*, 23, pp. 127–132 (1986)].

Due to the metabolic effects of 2-deoxy-D-glucose, injection of rats, rabbits and ruminants with relative high doses of 2-deoxy-D-glucose results in increased hunger and a substantial stimulation of food intake [see: M. Rezek and E. A. Kroeger; and T. R. Houpt, "Stimulation of Food Intake in Ruminants by 2-Deoxy-D-glucose and Insulin" *Am. J. Physiol.*, 227, pp. 161–167 (1974)].

All of the aforementioned effects of 2-deoxy-D-glucose known in the prior art have been observed using high dosages of 2-deoxy-D-glucose.

SUMMARY OF THE INVENTION

It has been surprisingly discovered that the feed conversion can be improved by meat-producing animals by orally administering to such animals dosages of 2-deoxy-D-hexose at lower levels than heretofore known in the art. Also surprising is that such improvement in feed conversion occurs without concommitant substantial stimulation of food intake.

More specifically, the present invention is directed to a method for improving the feed conversion of meat-producing animals comprising orally administering to said animals an effective amount no greater than about 120 milligrams (mg) per kilogram (kg) of body weight per day of a 2-deoxy-D-hexose. It is contemplated that mixtures of two or more 2-deoxy-D-hexoses are also within the scope of the present invention.

The present invention is also directed to an animal feed composition comprising standard animal feed for meat-producing animals in admixture with from about 0.005% to about 0.02% by weight of the total amount of the ultimate diet formulation of 2-deoxy-D-hexose.

As used herein, the term "2DG" refers to 2-deoxy-D-glucose; the term "2DGal" refers to 2-deoxy-D-galactose; the term "2DH" refers to 2-deoxy-D-hexose which is inclusive of 2DG, 2DGal and any other 2-deoxy six-carbon monosaccharide; the term "effective amount" refers to that amount of 2DH sufficient to improve the feed conversion of the treated animals as compared to untreated animals without resulting in any significant adverse side effects; the term "meat-producing animals" refers to any animal grown in the art of animal husbandry for use of its meat as food, such animals include ruminants such as cattle, sheep and goats a well as nonruminants such as swine and poultry; "standard animal feed for meat-producing animals" refers to that feed that can be used in the animal husbandry field and is suitable to be fed to meat-producing animals to supply part or all of the meat-producing animals' nutrient requirements.

DETAILED DESCRIPTION OF THE INVENTION

The feed conversion improvement activity of the present invention occurs without concommitant substatiantial or significant stimulation of food intake. Typically the food intake is the same or decreased in treated animals as compared to untreated animals. As used herein the expression "improving the feed conversion" and cognate expressions such as "feed conversion improvement" refer to improving feed utilization efficiency and/or improving growth rate. That is, in accordance with the method of the present invention, treated animals (as compared to untreated animals) can have substantially the same feed intake and grow at an increased growth rate, can have decreased feed intake and grow at substantially the same growth rate, or can have decreased feed intake and grow at an increased growth rate.

It is not desired to be bound by any particular mechanism or theory but it is believed that the 2DH acts as a metabolic modifier to result in improved feed conversion. However, the 2DH may also act as a growth permittant by eliminating inhibitory factors. For example, it is possible that certain microorganisms present in the digestive tract of meat-producing animals such as protozoa, bacteria and/or viruses can inhibit growth and/or nutrient utilization of the meat-producing animals. Therefore 2DH may function to inhibit such microorganisms thereby acting as a growth permittant.

2-Deoxy-D-glucose is a compound known in the art that has the structure:

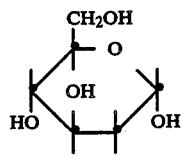

2DG can be synthesized using D-glucose as a starting material using methods known in the art, for example, the method taught by W. G. Overend, M. Stacey and J. Stanek, *J. Chem. Soc.*, 1, p. 2841 (1949).

For example, D-glucose can be completely acetylated with acetic anhydride with sulfuric acid as the catalyst. The exothermic reaction product is then treated with dry hydrogen bromide to prepare 2,3,4,6-tetraacetyl-D-glucopyranosyl bromode. After buffering the solution with aqueous base, the solution is treated with zinc metal for the preparation of tri-O-acetyl-D-glucal. After removal of zinc and its salts by filtration, aqueous acetic acid is removed under vacuum and the residue is partitioned between ethyl acetate and water. The crude product containing the glucal compound can then be purified by flash vacuum distillation or crystallization. The purified glucal compound is then treated with catalytic amounts of sodium methoxide in methanol or remove the acetyl groups. The resulting D-glucal can then be chemically hydrated with cold aqueous sulfuric acid to 2DG. Other 2DH's, such as 2DGal, can be prepared by similar procedures using the appropriate starting materials.

As appreciated in the art, effective amounts of 2DH for use in the present invention will vary somewhat depending upon the particular species of animal, age, growth conditions such as temperature and type of feed, and the like; however, the effective amount is always no greater than 120 mg per kg of body weight per day. For any particular case, the exact or optimal effective amount to be administered can be determined by conventional dose titration techniques.

In the method of the present invention it is preferred that 2DH is administered in a range from about 3 to about 120 mg per kg of body weight per day; a more preferred range is from about 3 to about 90 mg per kg of body weight per day. At concentrations above about 120 mg per kg of body weight per day 2DH is not effective to improve the feed conversion efficiency of animals.

2DH improves the feed conversion of both ruminant and nonruminant meat-producing animals. A preferred ruminant for use of the method of the present invention is cattle; preferred nonruminant animals are swine and poultry. The most preferred animal for use of the method of the present invention is poultry.

It is contemplated that the 2DH can be administered via water or via feed. Administration of 2DH by incorporation into animal feed is preferred for most applications.

2DH's useful in the present invention include 2DG, 2DGal, 2-deoxy-D-allose, 2-deoxy-D-altrose, 2-deoxy-D-gulose, 2-deoxy-D-idose, 2-deoxy-D-talose, and the like. Preferred 2DH's are 2DG and 2DGal, and most preferred is 2DG.

The compositions of the present invention can be formulated as end use feed mixes or can be formulated as feed premixes, supplements or concentrations. The compositions of the present invention can optionally contain one or more other physiologically acceptable additives which can be inert or act as adjuvants. Such additives include, but are not limited to, nutrients and carriers such as amino acids, organic acids, soybean meal, ground corn, ground corn cobs, corn oil, barley, wheat or other edible feed grade material, mineral or vitamin mixtures; innocuous diluents such as an alcohol, a glycol, or molasses; feed preservatives; antibiotics, coccidiostats; and the like. 2DH, whether administered via water or feed, can be used in combination with other treatments, whether for the same or a different purpose, such as use of drugs and hormone implants.

The compositions of the present invention contain an amount of 2DH in order for the animals to consume an amount of 2DH that will be effective in improving the animals feed conversion. The compositions of the present invention are diet formulations comprising standard animal feed for meat-producing animals in admixture with from about 0.00125% of about 0.08% by weight of the total amount of the ultimate diet formulation of 2DH; a preferred amount of 2DH is from about 0.005% to about 0.02%; and a most preferred amount of 2DH is from about 0.005% to about 0.015%. Orally administering compositions with the above-noted concentration of 2DH will result in the treated animals receiving an effective amount of the 2DH no greater than 120 mg/kg of body weight per day. Therefore a method for orally administering such compositions to meat-producing animals is also within the scope of the present invention. The exact amount desired to be in the diet formulation will vary depending upon age, weight, health and species of animal, the specific 2DH or mixture of 2DH's, other components in the diet formulation, and the like.

The present invention is illustrated by the following examples; however, these examples should not be interpreted as a limitation upon the scope of the present invention.

EXAMPLES

For the applicable examples that follow, the following statistical analysis was performed:

For all examples, the General Linear Model (GLM) procedure of the Statistical Analysis System (SAS), Cary, N.C., was used to determine the effects of the treatments on body weight, fed intake, daily gain and feed conversion. Body weight at the beginning of each experiment was the covariate used to adjust the performance data. Treatment comparisons for performance data were based on least square means comparisons. In the rat experiments, each individual rat was the unit of observation, while each pen was the unit of observation in the broiler experiments. No outlier rats were observed in Examples 1 and 2, but three rats died in Example 2. In the broiler experiments, outlier birds were identified when the studentized residual based on the pen mean and standard deviation was greater than 1.96 ($P<0.05$).

The following conditions and procedures were used for the applicable Examples 3, 4 and 6:

Chick batteries were turned on 72 hours prior to the scheduled arrival of the chicks from the hatchery. The temperature of each battery tier (3 tiers per battery) were checked frequently until the desired temperature was attained and stable for 24 hours. During the experimental periods, each battery was checked each morning. Battery temperature was maintained in the range of 93°-98° F. during the first 10 days of each experiment. After the initial 10 days, the temperature was reduced to 90° F., after 20 days to 86° F. and after 30 days to 75° F. The temperature was held at 75° F. for the duration of each experiment.

The water troughs were changed each morning (one trough per tier). Any trough less than two-thirds full in the afternoon was refilled. All feed troughs were at least one-half full at all time during the experiments.

Mortality was checked both morning and afternoon and any dead birds removed.

Tier waste was removed at least weekly.

EXAMPLE 1

Thirty-six Sprague-Dawley, male rats obtained from Blue Spruce Farms, Altamont, N.Y., were housed individually. The rats were approximately 56 days old at the beginning of the experiment. Water and food were provided ad lib using feed savers to minimize spillage. The rats were adjusted to the environment and fed a commercial rat chow (Purina Rodent Chow) for six days prior to the start of the experiment. The diet was ground so that the treatment levels of 2DG could be envenly distributed within the diets.

Four groups of rats with balanced starting weights (9 rats/group) were assigned to four treatment diets which were formulated and consumed in amounts that provided 0, 30, 60 and 90 mg 2DG/kg body weight. Weight gain and feed consumption were measured weekly. Fresh feed was introduced as needed to assure ad lib consumption, and fresh water was provided every two days. The experiment was conducted for 21 days. At the end of the experiment, the rats were anesthetized with ether and then exsanguinated for determination of plasma glucose, triglycerides and insulin.

The results are shown in Table 1 and Table 2.

As can be seen, daily gain and units of feed consumed per unit of gain ("feed/gain") were improved significantly with all levels of 2DG fed. The improvement in feed conversion was due to increased gain and not reduced feed intake.

TABLE 1

Effect of 2DG on Body Weight (Grams) and Dry Matter (DM) Intake (Grams/Day) of Rats[1]

| Treatment[2] | No. Rats | Body Weight (BW) | | | DM Feed Intake | |
|---|---|---|---|---|---|---|
| | | 0 Days | 21 Days | Prob[3] | 0–21 Days | Prob[3] |
| Control | 9 | 376.1 | 423.1 | | 23.58 | |
| A | 9 | 375.3 | 430.3 | ($P < .10$) | 23.57 | ($P < .99$) |
| B | 9 | 372.3 | 431.4 | ($P < .05$) | 23.64 | ($P < .91$) |
| C | 9 | 371.2 | 439.1 | ($P < .001$) | 24.10 | ($P < .35$) |

[1]Means are least squares means (LSMeans) adjusted using starting body weight (0 Days) as the covariate. Starting weight means are actual means.
[2]Control = 0 mg 2DG/kg BW; A = 30 mg 2DG/kg BW; B = 60 mg 2DG/kg BW; C = 90 mg 2DG/kg BW.
[3]Probability of difference from control.

TABLE 2

Effect of 2DG on Average Daily Gain (Grams/Day) and Feed/Gain (Grams DM Intake/Gram Gain) of Rats[1]

| Treatment[2] | No. Rats | Average Daily Gain | | Feed/Gain | |
|---|---|---|---|---|---|
| | | 0–21 Days | Prob[3] | 0–21 Days | Prob[3] |
| Control | 9 | 2.35 | | 10.25 | |
| A | 9 | 2.69 | ($P < .10$) | 8.90 | ($P < .02$) |
| B | 9 | 2.74 | ($P < .05$) | 8.70 | ($P < .005$) |
| C | 9 | 3.11 | ($P < .0005$) | 7.93 | ($P < .0001$) |
| | | Linear | ($P < .0005$)[4] | Linear | ($P < .0001$)[5] |

[1]Means are least squares means (LSMeans) adjusted using starting body weight (0 Days) as the covariate.
[2]Control = 0 mg 2DG/kg BW; A = 30 mg 2DG/kg BW; B = 60 mg 2DG/kg BW; C = 90 mg 2DG/kg BW.
[3]Probability of difference from control.
[4]Daily Gain = 2.37 + .008 × Diet Level.
[5]Feed/Gain = 10.02 − .024 × Diet Level.

EXAMPLE 2

Fifty Sprague-Dawley, male rats were obtained from Blue Spruce Farms, Altamont, N.Y., and were housed individually. Experimental conditions were similar to those in Example 1 with the following exceptions: five groups of rats with balanced starting weights (10 rats/group) were assigned to five treatment diets which were formulated and consumed in amounts that provided 0, 30, 60, 90 and 120 mg 2DG/kg body weight, the experiment was conducted for 63 days, and, at the end of the experiment, the rats were euthanized with ether and than prepared for determination of Kjeldahl nitrogen to measure total body protein.

The results are shown in Table 3 and Table 4. A numerical increase in daily gain was observed at 60 mg/kg of body weight per day and feed/gain tended to be improved with 60 mg/kg of body weight per day. Gain and feed/gain responses were significantly quadratic with increasing levels of 2DG which demonstrated that the performance improvements were dose level dependent.

TABLE 3

Effect of 2DG on Body Weight (Grams) and Dry Matter (DM) Intake (Grams/Day) of Rats[1]

| Treatment[2] | No. Rats | Body Weight (BW) | | | DM Feed Intake | |
|---|---|---|---|---|---|---|
| | | 0 Days | 63 Days | Prob[3] | 0–63 Days | Prob[3] |
| Control | 10 | 60.0 | 433.0 | | 24.39 | |
| A | 9 | 63.4 | 437.7 | ($P < .79$) | 25.09 | ($P < .38$) |
| B | 8 | 59.9 | 453.2 | ($P < .26$) | 24.87 | ($P < .56$) |
| C | 10 | 61.3 | 440.6 | ($P < .65$) | 24.49 | ($P < .90$) |

TABLE 3-continued

Effect of 2DG on Body Weight (Grams)
and Dry Matter (DM)
Intake (Grams/Day) of Rats[1]

| Treatment[2] | No. Rats | Body Weight (BW) 0 Days | 63 Days | Prob[3] | DM Feed Intake 0-63 Days | Prob[3] |
|---|---|---|---|---|---|---|
| D | 10 | 62.8 | 410.2 | (P < .19) | 24.43 | (P < .96) |

[1]Means are least squares means (LSMeans) adjusted using starting body weight (0 Days) as the covariate. Starting weight means are actual means.
[2]Control = 0 mg 2DG/kg BW; A = 30 mg 2DG/kg BW; B = 60 mg 2DG/kg BW; C = 90 mg 2DG/kg BW; D = 120 mg 2DG/kg BW.
[3]Probabiliy of difference from control.

TABLE 4

Effect of 2DG on Average Daily Gain
(Grams/Day) and Feed/Gain
(Grams DM Intake/Gram Gain) of Rats[1]

| Treatment[2] | No. Rats | Average Daily Gain 0-63 Days | Prob[3] | Feed/Gain 0-63 Days | Prob[3] |
|---|---|---|---|---|---|
| Control | 10 | 5.89 | | 4.15 | |
| A | 9 | 5.97 | (P < .79) | 4.21 | (P < .51) |
| B | 8 | 6.22 | (P < .26) | 4.01 | (P < .15) |
| C | 10 | 6.02 | (P < .65) | 4.10 | (P < .50) |
| D | 10 | 5.53 | (P < .19) | 4.42 | (P < .005) |
| | | Quadratic | (P < .05)[4] | Quadratic | (P < .003)[5] |

[1]Means are least squares means (LSMeans) adjusted using starting body weight (0 Days) as the covariate.
[2]Control = 0 mg 2DG/kg BW; A = 30 mg 2DG/kg BW; B = 60 mg 2DG/kg BW; C = 90 mg 2DG/kg BW; D = 120 mg 2DG/kg BW.
[3]Probability of difference from control.
[4]Daily Gain = 5.84 + .012 × Diet Level − .00012 × Diet Level$^2$.
[5]Feed/Gain = 4.21 − .006 × Diet Level + .000064 × Diet Level$^2$.

EXAMPLE 3

One hundred eighty-five White Mountain X Hubbard cross cockerels (Marek vaccinated) were obtained from Martin'Hatchery, Lancaster, Pa., and allowed to adapt to the environmental conditions of the room and batteries. After two days, the 185 birds were weighed. From the middle range, 160 birds were distributed among 20 groups. Four groups with eight birds per group were assigned to one of five treatment diets which were formulated and consumed in amounts that provided 0, 15, 30, 45, and 60 mg 2DG/kg body weight which corresponds, respectively, to 0, 0.02, 0.04, 0.06, and 0.08% 2DG of the diet formulation. Each treatment diet was assigned to each of the three tier levels (top, middle and bottom), and average starting weight of the groups was balanced. Each bird was identified by leg band and was weighed individually at the start of the experiment and at the end of each seven-day week for seven weeks. An Agway broiler ration containing b 21% crude protein, 0.0125% Amprolium, 0.0004% Ethopabate, and bacitracin methylene disalicylate was fed throughout the experiment. New feed was introduced as needed to assure ad lib consumption, and fresh water was provided daily.

The results are shown in Table 5 and Table 6. As can be seen, feed/gain was significantly improved about 3% with 15 mg/kg body weight per day.

TABLE 5

Effect of 2DG on Body Weight (Grams)
and Dry Matter (DM)
Intake (Grams/Day) of Growing Broilers[1]

| Treatment[2] | No. Birds | Body Weight (BW) 0 Days | 49 Days | Prob[3] | DM Feed Intake 0-49 Days | Prob[3] |
|---|---|---|---|---|---|---|
| Control | 27 | 52.5 | 2368.9 | | 94.96 | |
| A | 29 | 52.6 | 2337.3 | (P < .58) | 90.39 | (P < .17) |
| B | 29 | 52.7 | 2271.9 | (P < .10) | 89.66 | (P < .12) |
| C | 29 | 52.7 | 2285.3 | (P < .15) | 92.32 | (P < .42) |
| D | 30 | 52.8 | 2187.6 | (P < .006) | 87.71 | (P < .04) |

[1]Means are least squares means (LSMeans) adjusted using starting body weight (0 Days) as the covariate. Starting weight means are actual means.
[2]Control = 0 mg 2DG/kg BW; A = 15 mg 2DG/kg BW; B = 30 mg 2DG/kg BW; C = 45 mg 2DG/kg BW; D = 60 mg 2DG/kg BW.
[3]Probability of difference from control.

TABLE 6

Effect of 2DG on Average Daily Gain
(Grams/Day)
and Feed/Gain (Grams DM Intake/Gram Gain)
of Growing Broilers[1]

| Treatment[2] | No. Birds | Average Daily Gain 0-49 Days | Prob[3] | Feed/Gain 0-49 Days | Prob[3] |
|---|---|---|---|---|---|
| Control | 27 | 47.27 | | 2.00 | |
| A | 29 | 46.62 | (P < .58) | 1.94 | (P < .05) |
| B | 29 | 45.29 | (P < .10) | 1.98 | (P < .42) |
| C | 29 | 45.57 | (P < .15) | 2.02 | (P < .63) |
| D | 30 | 43.47 | (P < .006) | 2.01 | (P < .88) |
| | | Linear | (P < .002)[4] | | |

[1]Means are least squares means (LSMeans) adjusted using starting body weight (0 Days) as the covariate.
[2]Control = 0 mg 2DG/kg BW; A = 15 mg 2DG/kg BW; B = 30 mg 2DG/kg BW; C = 45 mg 2DG/kg BW; D = 60 mg 2DG/kg BW.
[3]Probability of difference from control.
[4]Daily Gain = 47.33 − .056 × Diet Level.

EXAMPLE 4

One hundred eighty-five White Mountain X Hubbard cross cockerels (Marek vaccinated) were obtained from Martin's Hatchery, Lancaster, Pa., and allowed to adapt to the environmental conditions of the room and batteries. Experimental conditions were similar to those in Example 3 with the following exception: treatment diets were formulated and consumed in amounts that provided 0, 5, 10, 15 and 20 mg 2DG/kg body weight which corresponds, respectively, to 0, 0.007, 0.014, 0.021, and 0.028% 2DG of the diet formulation.

The results are shown in Table 7 and Table 8.

As can be seen, daily gain was increased linearly and feed/gain responses were quadratic with increasing levels of 2DG. This indicated that although no individual treatment level significantly improved daily gain and feed/gain, a significant biological relationship between response and dose level was demonstrated. Feed/gain was improved most with doses of 5 and 10 mg/kg of body weight per day.

TABLE 7

Effect of 2DG on Body Weight (Grams)
and Dry Matter (DM)
Intake (Grams/Day) of Growing Broilers[1]

| Treatment[2] | No. Birds | Body Weight (BW) 0 Days | 49 Days | Prob[3] | DM Feed Intake 0-49 Days | Prob[3] |
|---|---|---|---|---|---|---|
| Control | 31 | 73.5 | 2240.7 | | 85.71 | |
| A | 27 | 73.3 | 2256.3 | (P < .83) | 82.57 | (P < .48) |
| B | 27 | 72.9 | 2301.2 | (P < .43) | 85.48 | (P < .97) |
| C | 26 | 72.8 | 2380.1 | (P < .09) | 91.18 | (P < .26) |

TABLE 7-continued

Effect of 2DG on Body Weight (Grams)
and Dry Matter (DM)
Intake (Grams/Day) of Growing Broilers[1]

| Treat-ment[2] | No. Birds | Body Weight (BW) 0 Days | 49 Days | Prob[3] | DM Feed Intake 0–49 Days | Prob[3] |
|---|---|---|---|---|---|---|
| D | 28 | 72.9 | 2357.4 | (P < .15) | 92.29 | (P < .17) |

[1]Means are least squares means (LSMeans) adjusted using starting body weight (0 Days) as the covariate. Starting weight means are actual means.
[2]Control = 0 mg 2DG/kg BW; A = 5 mg 2DG/kg BW; B = 10 mg 2DG/kg BW; C = 15 mg 2DG/kg BW; D = 20 mg 2DG/kg BW.
[3]Probability of difference from control.

TABLE 8

Effect of 2DG on Average Daily Gain
(Grams/Day)
and Feed/Gain (Grams DM Intake/Gram Gain)
of Growing Broilers[1]

| Treatment[2] | No. Birds | Average Daily Gain 0–49 Days | Prob[3] | Feed/Gain 0–49 Days | Prob[3] |
|---|---|---|---|---|---|
| Control | 31 | 44.24 | | 1.94 | |
| A | 27 | 44.56 | (P < .83) | 1.86 | (P < .23) |
| B | 27 | 45.47 | (P < .44) | 1.88 | (P < .42) |
| C | 26 | 47.07 | (P < .09) | 1.93 | (P < .96) |
| D | 28 | 46.62 | (P < .14) | 1.98 | (P < .56) |
| | | Linear | (P < .15)[4] | Quadratic | (P < .09)[5] |

[1]Means are least squares means (LSMeans) adjusted using starting body weight (0 Days) as the covariate.
[2]Control = 0 mg 2DG/kg BW; A = 5 mg 2DG/kg BW; B = 10 mg 2DG/kg BW; C = 15 mg 2DG/kg BW; D = 20 mg 2DG/kg BW.
[3]Probability of difference from control.
[4]Daily Gain = 44.64 + .096 × Diet Level.
[5]Feed/Gain = 1.92 − .012 × Diet Level + .00077 × Diet Level$^2$.

EXAMPLE 5

Nine hundred Ross X Ross parented chicks were feather-sexed, vaccinated for Newcastle Disease, infectious bronchitis and Marek's Disease. Four hundred fifty male (cockerel) and four hundred fifty female chicks were used. Six replicates with 50 birds (25 male and 25 female) per replicate were assigned to one of three treatment diets, 0, 0.01% and 0.02% 2DG in the diet formulation. Average starting weight of the replicates was balanced. Weight gain and feed conversion were measured at 21 and 40 days of age. Feed and water were supplied ad lib. Birds in each replicate were housed in a 5' × 10' concrete floored pen with pine shavings. Each pen was temperature controlled. A starter ration (21% crude protein) containing approximately 0.02% oxytetracycline was fed the first 21 days of the experiment, and a finisher ratio (19% crude protein) containing approximately 0.0004% lincomycin was fed the last 19 days of the experiment. Treatment diets were prepared in 400 to 500 pound batches with each batch being divided among the six replicates.

The results are shown in Table 9 and Table 10. As can be seen, daily gain and feed/gain were significantly improved about 2.7% and 2.9%, respectively, in birds fed 0.02% of the diet /formulation.

TABLE 9

Effect of 2DG on Body Weight (Grams)
and Dry Matter (DM)
Intake (Grams/Day) of Growing Broilers[1]

| Treatment % 2DG of the Diet Formulation | No. Birds | Body Weight (BW) 0 Days | 40 Days | Prob[2] | DM Feed Intake 0–40 Days | Prob[3] |
|---|---|---|---|---|---|---|
| Control (0%) | 299 | 39.0 | 1631.7 | | 68.91 | |
| 0.01% | 297 | 39.3 | 1658.9 | (P < .34) | 69.88 | (P < .41) |
| 0.02% | 243 | 39.0 | 1675.0 | (P < .14) | 69.08 | (P < .89) |

[1]Means are least squares means (LSMeans) adjusted using starting body weight (0 Days) as the covariate. Starting weight means are actual means.
[2]Probability of difference from control.

TABLE 10

Effect of 2DG on Average Daily Gain
(Grams/Day) and Feed/Gain
(Grams DM Intake/Gram Gain)
of Growing Broilers[1]

| Treatment % 2DG of the Diet Formulation | No. Birds | Average Daily Gain 0–40 Days | Prob[2] | Feed/Gain 0–40 Days | Prob[2] |
|---|---|---|---|---|---|
| Control (0%) | 299 | 39.81 | | 1.73 | |
| 0.01% | 297 | 40.49 | (P < .34) | 1.72 | (P < .75) |
| 0.02% | 243 | 40.90 | (P < .14) | 1.68 | (P < .01) |

[1]Means are least squares means (LSMeans) adjusted using starting body weight (0 Days) as the covariate.
[2]Probability of difference from control.

EXAMPLE 6

Two hundred and eighty-eight White Mountain X Hubbard cross cockerels (Marek vaccinated) were obtained from Martin's Hatchery, Lancaster, Pa., and allowed to adapt to the environmental conditions of the room and batteries. After three days, the 288 birds were weighed and were distributed among 36 groups. Six groups with eight birds per group were asigned to each of the control and 2DG treatments, and four groups with eight birds per group were assigned to the 2DGal treatments. Average starting weight of the groups was balanced. 2DG and 2DGal were fed at levels of 0.005%, 0.01%, and 0.02% of diet formulations. In order to eliminate location effect, each treatment was assigned to cages having different positions in the battery units (top, middle, and bottom). On day 21 of the experiment, birds were transferred from the brooder cages to finisher cages. A commercial broiler ration (Southern States) containing 20% crude protein, 0.0125% Amprolium, and 0.004% Ethopabate (anticoccidials) was fed throughout the experiment. The ration did not contain an antibiotic. New feed was introduced as needed to assure ad lib consumption, and fresh water was provided daily. Weekly body weight gain and feed consumption were determined on a pen basis, and the weight of a deceased bird was included in the total pen gain for the week.

Feed/gain was improved 5.3% with each of the three levels of 2DG (0.005%, 0.01%, and 0.02% of diet formulation). Results are shown in Table 11. When the 2DG treatments were pooled, feed/gain was improved 5.3%±5.2% (response and 95% confidence limits) when compared with the control. Total feed consumption and total pen gain were not significantly affected by the 2DG treatments; however, because there was a numerical increase in gain and no real difference in feed consumption, feed conversion was improved with the 2DG treatments.

When compared with the control, feed/gain was improved 6.6%±6.7% (response±95% confidence limit) and 7.9%±7.3% with 0.01% and 0.02% 2DGal of diet formulation, respectively. No improvement in feed/gain was observed with 0.005% 2DGal of diet formulation. Total feed consumption and total pen gain were not significantly affected by the 2DGal treatments, except that daily gain was increased 17.0%±17.5% with 0.02% 2DGal of the diet formulation.

weight of a deceased bird was included in the total pen gain.

Birds were housed in floor pens with pine shavings and saw dust. Commercial diets (mash form) were prepared in 1,000 pound batches with each batch being divided among the ten pens of each treatment. The control and treatment diets contained monensin sodium to aid in the prevention of coccidiosis and bacitracin methylene disalicylate to aid in the control of necrotic enteritis and to increase rate of gain and improve feed conversion.

Results are shown in Tables 12 and 13. Feed/gain was

TABLE 11

Performance Responses of Growing Broilers Fed Varying Levels of 2-Deoxy-D-Glucose (2DG) or 2-Deoxy-D-Galactose (2DGal)

| Treatment | Treatment Levels Mg/Kg of Feed; % of Diet | Pen Nos.* | Performance Responses (42 Days)** | | | | |
|---|---|---|---|---|---|---|---|
| | | | Pen Weight (Kgs) Start | Finish | Total Pen Gain (Kgs) | Feed Gain (Kgs Feed/ Kg Gain) | Total Pen DM Intake (Kgs) |
| Control | 0;.000% | 5 | .659 | 14.581 | 13.92 | 2.28 | 31.58 |
| 2DG | 50;.005% | 5 | .652 | 16.004 | 15.35 | 2.16 | 33.13 |
| | | | | | (P < .20)*** | (P < .10) | (P < .44) |
| 2DG | 100;.010% | 6 | .656 | 15.335 | 14.68 | 2.16 | 31.68 |
| | | | | | (P < .46) | (P < .10) | (P < .96) |
| 2DG | 200;.020% | 5 | .659 | 16.378 | 15.72 | 2.16 | 33.87 |
| | | | | | (P < .10) | (P < .10) | (P < .25) |
| 2DGal | 50;.005% | 4 | .655 | 15.036 | 14.38 | 2.24 | 32.13 |
| | | | | | (P < .69) | (P < .56) | (P < .79) |
| 2DGal | 100;.010% | 4 | .651 | 15.723 | 15.07 | 2.13 | 31.74 |
| | | | | | (P < .33) | (P < .07) | (P < .94) |
| 2DGal | 200;.020% | 3 | .655 | 16.959 | 16.30 | 2.10 | 34.26 |
| | | | | | (P < .06) | (P < .04) | (P < .24) |

*Eight birds per pan.
**Least squares means (means covariately adjusted using starting weight) are presented.
***Probability of difference from control.

EXAMPLE 7

Eight thousand five hundred and eighty Ross X Peterson crossed chicks were vent-sexed and vaccinated for Newcastle Disease, infectious bronchitis and Marek's Disease. Ten replicates (pens) with 66 birds (33 males and 33 females) per replicate were assigned to one of thirteen treatments. Average starting weight of the groups was balanced. 2-Deoxy-D-glucose and 2-deoxy-D-galactose were fed at levels of 0.00125%, 0.0025%, 0.005%, 0.01%, 0.02% and 0.04% of the diet formulation. Weight gain was measured at 46 days of age, and feed and water weighed and their weight recorded. The significantly improved 2% with 0.01% 2DG of the diet. Total feed consumption and total pen gain were not significantly affected by the 2DG treatment; however, because there was a numerical increase in gain and a decrease in consumption, feed conversion was improved. In addition, there was a biological relationship between response and dose level evidenced by a significant quadratic fit.

When compared with the control, feed/gain was significantly improved with 0.01%, 0.02% and 0.04% 2DGal of the diet formulation. There was a trend toward a linear improvement in feed/gain with increasing dose level.

TABLE 12

Performance Responses of Growing Broilers Fed Varying Levels of 2-Deoxy-D-Glucose (2DG)

| Treatment | Treatment Levels Mg/Kg of Feed; % of Diet | No. of Pens* | Performance Responses (42 Days)** | | | | |
|---|---|---|---|---|---|---|---|
| | | | Pen Weight (Kgs) Start | Finish | Total Pen Gain (Kgs) | Feed Gain (Kgs Feed/ Kg Gain) | Total Pen DM Intake (Kgs) |
| Control | 0;.000% | 10 | 2.805 | 130.382 | 127.354 | 1.964 | 250.042 |
| 2DG,1X | 12.5;.00125% | 10 | 2.788 | 132.827 | 130.121 | 1.940 | 252.359 |
| | | | | | (P < .06) | (P < .14) | (P < .35) |
| 2DG,2X | 25;.0025% | 10 | 2.775 | 130.179 | 127.725 | 1.940 | 247.749 |
| | | | | | (P < .80) | (P < .14) | (P < .36) |
| 2DG,4X | 50;.005% | 10 | 2.797 | 131.982 | 129.119 | 1.937 | 250.052 |
| | | | | | (P < .22) | (P < .10) | (P < .99) |
| 2DG,8X | 100;.010% | 10 | 2.806 | 131.714 | 128.666 | 1.922 | 247.298 |
| | | | | | (P < .36) | (P < .01) | (P < .27) |
| 2DG,16X | 200;.020% | 9 | 2.785 | 131.344 | 128.712 | 1.931 | 248.459 |
| | | | | | (P < .36) | (P < .05) | (P < .54) |
| 2DG,32X | 400;.040% | 10 | 2.793 | 124.491 | 121.688 | 1.969 | 239.517 |
| | | | | | (P < .0002) | (P < .73) | (P < .0001) |
| | | | | | | Quadratic | |

TABLE 12-continued

Performance Responses of Growing Broilers
Fed Varying Levels of 2-Deoxy-D-Glucose
(2DG)

| Treatment | Treatment Levels Mg/Kg of Feed; % of Diet | No. of Pens* | Performance Responses (42 Days)** | | | | |
|---|---|---|---|---|---|---|---|
| | | | Pen Weight (Kgs) Start | Finish | Total Pen Gain (Kgs) | Feed Gain (Kgs Feed/ Kg Gain) (P = .01) | Total Pen DM Intake (Kgs) |

*Sixty-six birds per pen.
**Least squares means (means covariately adjusted using starting weight) are presented.
***Probability of difference from control.

TABLE 13

Performance Responses of Growing Broilers
Fed Varying Levels of 2-Deoxy-D-Galactose
(2DGal)

| Treatment | Treatment Levels Mg/Kg of Feed; % of Diet | No. of Pens* | Pen Weight (Kgs) Start | Finish | Total Pen Gain (Kgs) | Feed Gain (Kgs Feed/ Kg Gain) | Total Pen DM Intake (Kgs) |
|---|---|---|---|---|---|---|---|
| Control | 0;.000% | 10 | 2.805 | 130.382 | 127.057 | 1.964 | 249.602 |
| 2DGal,1X | 12.5;.00125% | 10 | 2.793 | 131.642 | 128.634 ($P < .24$) | 1.930 ($P < .009$) | 248.266 ($P < .53$) |
| 2DGal,2X | 25;.0025% | 10 | 2.781 | 130.896 | 128.211 ($P < .39$) | 1.938 ($PC < .04$) | 248.387 ($P < .58$) |
| 2DGal,4X | 50;.005% | 9 | 2.783 | 131.869 | 129.122 ($P < .14$) | 1.934 ($P < .03$) | 249.696 ($P < .97$) |
| 2DGal,8X | 100;.010% | 10 | 2.790 | 132.407 | 129.487 ($P < .07$) | 1.928 ($P < .007$) | 249.666 ($P < .98$) |
| 2DGal,16X | 200;.020% | 10 | 2.774 | 131.278 | 128.780 ($P < 20$) | 1.929 ($P < 007$) | 248.302 ($P < .55$) |
| 2DGal,32X | 400;.040% | 10 | 2.767 | 133.117 | 130.809 ($P < 008$) | 1.916 ($P < 001$) Linear ($P = .10$) | 250.611 ($P < 65$) |

*Sixty-six birds per pen.
**Least squares means (means covariately adjusted using starting weight) are presented.
***Probability of difference from control.

The invention has been described in detail with particular reference to preferred embodiments thereof, but it will be understood that variations and modifications can be effected within the spirit and scope of the invention.

I claim:

1. A method for improving the feed conversion of meat-producing animals comprising orally administering to said animals an effective amount no greater than about 120 mg per kg of body weight per day of 2-deoxy-D-hexose.

2. The method of claim 1 wherein said 2-deoxy-D-hexose is 2-deoxy-D-glucose or 2-deoxy-D-galactose.

3. The method of claim 1 wherein said 2-deoxy-D-hexose is 2-deoxy-D-glucose.

4. The method of claim 1 wherein said effective amount is between about 3 and about 120 mg per kg of body weight per day.

5. The method of claim 1 wherein said effective amount is between about 3 and about 90 mg per kg of body weight per day.

6. The method of claim 1 wherein said meat-producing animals are selected from the group consisting of cattle, swine and poultry.

7. The method of claim 1 wherein said meat-producing animals are poultry.

8. The method of claim 3 wherein said meat-producing animals are poultry.

9. An animal feed composition which is a diet formulation comprising standard animal feed for meat-producing animals in admixture with from about 0.00125% to about 0.08% 2-deoxy-D-hexose by weight of the total weight of the diet formulation.

10. The composition of claim 9 wherein said 2-deoxy-D-hexose is 2-deoxy-D-glucose or 2-deoxy-D-galactose.

11. The composition of claim 9 wherein said 2-deoxy-D-hexose is 2-deoxy-D-glucose.

12. The composition of claim 9 wherein the amount of 2-deoxy-D-hexose is from about 0.005% to about 0.02% by weight of the total weight of the diet formulation.

13. The composition of claim 9 wherein the amount of 2-deoxy-D-hexose is from about 0.005% to about 0.015% by weight of the total weight of the diet formulation.

14. The composition of claim 9 containing at least one physiologically acceptable additive.

15. The composition of claim 14 wherein said additive is selected from the group consisting of amino acids, organic acids, soybean meal, ground corn, ground corn cobs, corn oil, barley, wheat, mineral mixtures, vitamin mixtures, an alcohol, a glycol, molasses, feed preservatives, antibiotics, and coccidiostats.

16. A method for improving the feed conversion of meat-producing animals comprising orally administering to said animals an animal feed composition which is a diet formulation comprising standard animal feed for meat-producing animals in admixture with from about 0.00125% to about 0.08% 2-deoxy-D-hexose by weight of the total weight of the diet formulation.

17. The method of claim 16 wherein said 2-deoxy-D-hexose is 2-deoxy-D-glucose or 2-deoxy-D-galactose.

18. The method of claim 16 wherein said 2-deoxy-D-hexose is 2-deoxy-D-glucose.

19. The method of claim 16 wherein the amount of 2-deoxy-D-hexose in said composition is from about 0.005% to about 0.02% by weight of the total weight of the diet formulation.

20. The method of claim 16 wherein the amount of 2-deoxy-D-hexose in said composition is from about 0.005% to about 0.015% by weight of the total weight of the diet formulation.

21. The method of claim 16 wherein said meat-producing animals are selected from the group consisting of cattle, swine, and poultry.

22. The method of claim 16 wherein said meat-producing animals are poultry.

23. The method of claim 18 wherein said meat-producing animals are poultry.

24. The method of claim 16 wherein said composition contains at least one physiologically acceptable additive.

25. The method of claim 24 wherein said additive is selected from the group consisting of amino acids, organic acids, soybean meal, ground corn, ground corn cobs, corn oil, barley, wheat, mineral mixtures, vitamin mixtures, an alcohol, a glycol, molasses, feed preservatives, antibiotics, and coccidiostats.

* * * * *